United States Patent
Gooden

(10) Patent No.: US 11,800,051 B2
(45) Date of Patent: Oct. 24, 2023

(54) DEVICE AND METHOD FOR OPTICAL SENSOR CALIBRATION

(71) Applicant: Raytheon Company, Waltham, MA (US)

(72) Inventor: Dominic R. Gooden, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 62 days.

(21) Appl. No.: 17/554,785

(22) Filed: Dec. 17, 2021

(65) Prior Publication Data

US 2023/0199140 A1     Jun. 22, 2023

(51) Int. Cl.
*H04N 5/33*         (2023.01)
*G01N 21/27*        (2006.01)

(52) U.S. Cl.
CPC .............. *H04N 5/33* (2013.01); *G01N 21/274* (2013.01)

(58) Field of Classification Search
CPC .......... H04N 5/33; H04N 23/20; H04N 23/22; H04N 23/23; G01N 21/274
See application file for complete search history.

(56) References Cited

U.S. PATENT DOCUMENTS

| | | | | |
|---|---|---|---|---|
| 5,218,416 A | * | 6/1993 | Haring | G01N 21/274 250/252.1 |
| 7,592,588 B2 | * | 9/2009 | Moskun | G02B 27/0938 356/417 |
| 8,471,496 B2 | * | 6/2013 | Knapp | H04L 12/43 315/307 |
| 8,523,419 B2 | * | 9/2013 | Nevitt | F21V 7/04 362/613 |
| 2020/0174353 A1 | * | 6/2020 | Grunwald | G03B 21/204 |

* cited by examiner

*Primary Examiner* — David P Porta
*Assistant Examiner* — Fani Polyzos Boosalis
(74) *Attorney, Agent, or Firm* — Renner, Otto, Boisselle & Sklar

(57) ABSTRACT

A calibration disc for providing uniform irradiance to an optical sensor system includes a first major surface, a second major surface opposite the first major surface, and an edge surface extending around a circumference of the calibration disc. The first major surface is fully reflective and partially diffuse, the second major surface is partially reflective and partially diffuse, and the edge surface is fully reflective and partially diffuse and has an entrance aperture positioned at the edge surface and configured to receive light into the calibration disc. The first major surface, the second major surface and the edge surface are configured to scatter the light received by the entrance aperture within the calibration disc. The second major surface is configured to emit at least some of the light with uniform irradiance.

20 Claims, 5 Drawing Sheets

DEVICE AND METHOD FOR OPTICAL SENSOR CALIBRATION

GOVERNMENT LICENSE RIGHTS

This disclosure was made with Government support under contract number FA8814-21-9-0001, awarded by the United States Department of Defense. The Government has certain rights in the invention.

TECHNICAL FIELD

The present disclosure relates generally to optical sensor systems and more particularly to calibration of optical sensor systems.

BACKGROUND

Optical sensor systems, such as infrared detector assemblies, include a focal plane having an array of pixels. These pixels are prone to some fluctuation in their response behavior over the life of the optical sensor system, potentially leading to erroneous measurement data. Therefore, to ensure uniformity and accuracy of measurements, it is important to regularly calibrate the optical sensor system by performing non-uniformity correction (NUC) of the focal plane. NUC corrects for pixel-to-pixel variations and changes in the pixel response over time. NUC is typically accomplished by placing a large calibration light source at or near an entrance aperture of the optical sensor system to uniformly illuminate the entire focal plane at once. If there is room within the optical sensor system, the calibration light source may be inserted directly into the optical path, or a fold mirror may be used to direct the calibration light source energy toward the focal plane. Performing this NUC is important not only before deployment of the optical sensor system, but also in the field after it has been deployed and during the operational mission. Accordingly, the calibration system must be integrated onboard the optical sensor system, requiring dedicated mechanisms to move the calibration light source into and out of the field of view of the focal plane. Using a dedicated mechanism increases cost and reduces system reliability. Specifically, this integration increases system complexity which increases the probability of system failure. Additionally, for optical sensor systems having cryogenically cooled optical detectors in a cryogenic thermal enclosure, such increased complexity may interfere with the thermal or structural design of the optical sensor system. For optical sensor systems where the reliability reduction due to an additional mechanism is outweighed by the benefits of performing a full optical sensor system calibration, there can be challenges to integrating full field calibrators when volume, mass and complexity are considered.

SUMMARY

A calibration disc for providing uniform irradiance to an optical sensor system is described herein. The calibration disc may be solid with a non-zero positive index of refraction greater than 1, or hollow with an index of refraction equal to that of the vacuum, air or any other gas mixture appropriate for the intended application. The calibration disc serves as a psudo-2-D integrating sphere, producing the same optical uniformity of a standard 3-D large volume integrating sphere with an optical element that is as small as the exit aperture of the standard 3-D integrating sphere. The calibration disc includes two major surfaces and an edge surface, all being partially diffuse, with a first major surface and the edge surface being fully reflective and a second major surface opposite the first major surface being partially reflective. The calibration disc is arranged so that the second major surface faces in the direction of the optical detector, and illuminates it either directly, or through part or all of the optical sensor system. Accordingly, when light enters an entrance aperture on the edge surface of the calibration disc, the surfaces use specular reflection and Lambertian scattering, for example, to fill the calibration disc with scattered light. Being only partially reflective, the second major surface facing the optical sensor system or inserted into it and facing the detector, emits at least some of the scattered light toward the optical sensor system with uniform irradiance.

According to an aspect of this disclosure, a calibration disc for providing uniform irradiance to an optical sensor system includes a first major surface, the first major surface being fully reflective and partially diffuse. The calibration disc also includes a second major surface opposite the first major surface, the second major surface being partially reflective and partially diffuse. The calibration disc also includes an edge surface extending around a circumference of the calibration disc, the edge surface being fully reflective and partially diffuse and having an entrance aperture positioned at the edge surface and configured to receive light into the calibration disc. The first major surface, the second major surface and the edge surface are configured to scatter the light received by the entrance aperture within the calibration disc, and the second major surface is configured to emit at least some of the light with uniform irradiance.

According to an embodiment of any paragraph(s) of this disclosure, the entrance aperture is positioned at the edge surface at an angle relative to the edge surface.

According to another embodiment of any paragraph(s) of this disclosure, the entrance aperture includes an anti-reflective coating.

According to another embodiment of any paragraph(s) of this disclosure, the first major surface is in the range of 5% to 20% diffuse.

According to another embodiment of any paragraph(s) of this disclosure, the second major surface is in the range of 5% to 20% diffuse.

According to another embodiment of any paragraph(s) of this disclosure, the second major surface is in the range of 30% to 60% reflective.

According to another embodiment of any paragraph(s) of this disclosure, the edge surface is in the range of 1% to 10% diffuse.

According to another aspect of this disclosure, a calibration assembly for providing uniform irradiance to an optical sensor system includes a light source and a calibration disc remote from the light source. The calibration disc includes a first major surface, the first major surface being fully reflective and partially diffuse. The calibration disc also includes a second major surface opposite the first major surface, the second major surface being partially reflective and partially diffuse. The calibration disc also includes an edge surface extending around a circumference of the calibration disc, the edge surface being fully reflective and partially diffuse and having an entrance aperture positioned at the edge surface and configured to receive light from the light source into the calibration disc. The first major surface, the second major surface and the edge surface scatter the light received from the light source by the entrance aperture within the calibration disc, and the second major surface emits at least some of the light with uniform irradiance.

According to another embodiment of any paragraph(s) of this disclosure, the light source includes a light generator for generating the light and a light guide coupled to the light generator at a proximal end of the light guide for guiding the light from the light generator to a distal end of the light guide. The distal end of the light guide directs the light at the entrance aperture of the calibration disc.

According to another embodiment of any paragraph(s) of this disclosure, the light generator is at least one of a light-emitting diode (LED) and a beam forming optic, and the light guide is at least one of a waveguide and a fiber optic.

According to another embodiment of any paragraph(s) of this disclosure, the distal end of the light guide includes an anti-reflective coating.

According to another embodiment of any paragraph(s) of this disclosure, the entrance aperture of the calibration disc includes an anti-reflective coating.

According to another embodiment of any paragraph(s) of this disclosure, the entrance aperture is positioned at the edge surface of the calibration disc at an angle relative to the edge surface.

According to another embodiment of any paragraph(s) of this disclosure, the first major surface of the calibration disc is in the range of 5% to 20% diffuse.

According to another embodiment of any paragraph(s) of this disclosure, the second major surface of the calibration disc is in the range of 5% to 20% diffuse.

According to another embodiment of any paragraph(s) of this disclosure, the second major surface of the calibration disc is in the range of 30% to 60% reflective.

According to another embodiment of any paragraph(s) of this disclosure, the edge surface of the calibration disc is in the range of 1% to 10% diffuse.

According to an aspect of this disclosure, a method for providing uniform irradiance to an optical sensor system includes the step of providing light from a light source to an entrance aperture of a calibration disc remote from the light source. The calibration disc includes a first major surface, the first major surface being fully reflective and partially diffuse. The calibration disc also includes a second major surface opposite the first major surface, the second major surface being partially reflective and partially diffuse. The calibration disc also includes an edge surface extending around a circumference of the calibration disc, the edge surface being fully reflective and partially diffuse and having the entrance aperture positioned at the edge surface. The method further includes the steps of scattering the light within the calibration disc by each of the first major surface, the second major surface, and the edge surface, and emitting at least some of the light from the second major surface toward the optical sensor system with the uniform irradiance.

According to an embodiment of any paragraph(s) of this disclosure, the first major surface of the calibration disc is in the range of 5% to 20% diffuse, and the edge surface of the calibration disc is in the range of 1% to 10% diffuse.

According to another embodiment of any paragraph(s) of this disclosure, the second major surface of the calibration disc is in the range of 5% to 20% diffuse, and in the range of 30% to 60% reflective.

The following description and the annexed drawings set forth in detail certain illustrative embodiments described in this disclosure. These embodiments are indicative, however, of but a few of the various ways in which the principles of this disclosure may be employed. Other objects, advantages and novel features will become apparent from the following detailed description when considered in conjunction with the drawings.

BRIEF DESCRIPTION OF DRAWINGS

The annexed drawings show various aspects of the disclosure.

DETAILED DESCRIPTION

Figure 1:
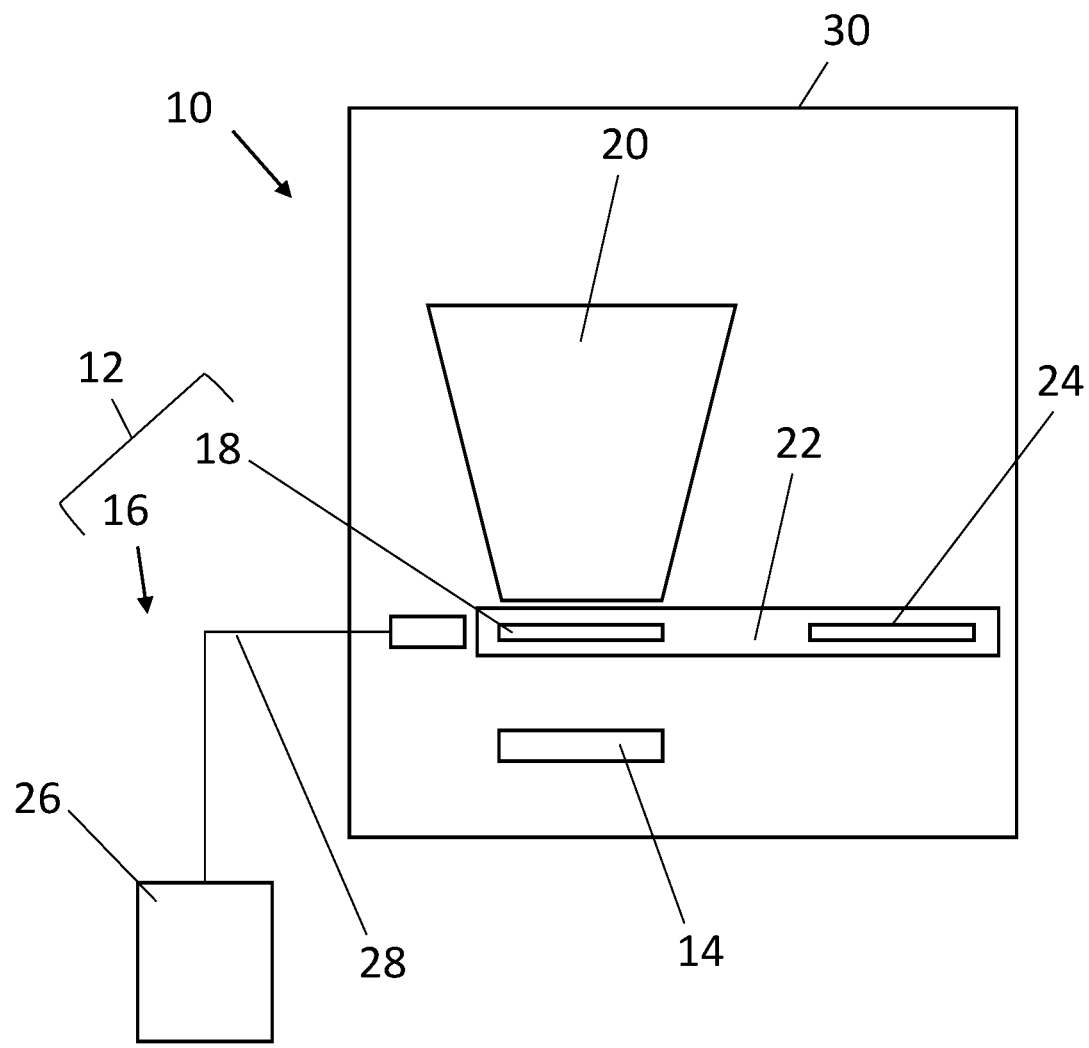
FIG. 1 is a general schematic of an optical sensor system.

With reference to FIG. 1, a general schematic of an optical sensor system 10 is depicted. The optical sensor system 10 includes a calibration assembly 12 for providing uniform irradiance to the optical sensor system 10, such as directly to an optical detector array 14 of the optical sensor system 10 to aid in performing non-uniformity correction (NUC) on the optical detector array 14. Specifically, the calibration assembly 12 includes a light source 16 and a calibration disc 18 configured to scatter light received from the light source 16 and emit the light toward the optical detector array 14 with uniform irradiance in angle and position such that the flux density of photons, collected by an optical detector array some distance away, is uniform across the area of the detector. During NUC in the optical sensor system 10, the calibration disc 18 is positioned to face the optical detector array 14 in the optical sensor system 10. For example, during NUC, the calibration disc 18 may be disposed between an optical instrument 20 of the optical sensor system 10, such as a telescope, and the optical detector array 14 of the optical sensor system 10.

Figure 2:
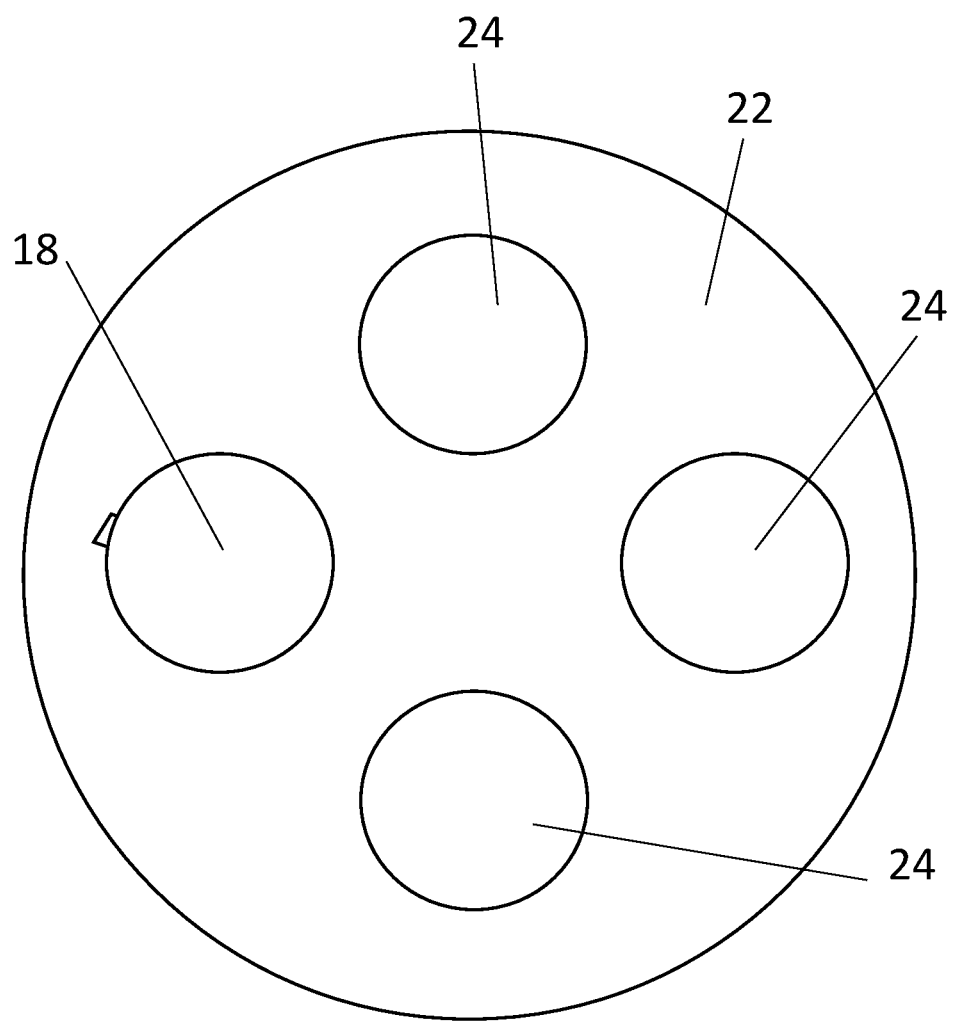
FIG. 2 is a general top view of a filter selector platter in the optical sensor system of FIG. 1.

The optical sensor system 10 may be configured to selectively position the calibration disc 18 between the optical instrument 20 and the optical detector array 14 such that NUC may be performed after deployment of the optical sensor system 10 and at any time during the operational mission of the optical sensor system 10, as necessary. It will be understood that the calibration disc 18 may be positioned elsewhere in the optical path of the optical sensor system 10, such as in a position in front of the first element in the optical path. Specifically, the optical sensor system 10 may be configured to selectively switch between performing NUC with the calibration disc 18 and performing normal measurements with another filter optic positioned between the optical instrument 20 and the optical detector array 14. Accordingly, the calibration disc 18 may be provided in an existing filter selector platter 22 having at least one other filter optic 24. For example, FIG. 2 depicts the filter selector platter 22 having three other filter optics 24. The filter selector platter 22 may be rotated with, for example, a switching device, to selectively position the calibration disc 18 and any one of the other filter optics 24 between the optical instrument 20 and the optical detector array 14. As many standard optical sensor systems include such filter selector platters, integration of the calibration disc 12 into the filter selector platter 22 may not require complex structural or functional design considerations and may be relatively inexpensive.

Turning back to FIG. 1, the light source 16 may include a light generator 26 for generating the light and a light guide 28 for guiding the light from the light generator 26 to the calibration disc 18. Additionally or alternatively, light from the light generator 26 and/or the light guide 28 may be transported to the calibration disc 18 by free space coupling with, for example, a collimated beam. In this manner, the light generator 26 may be provided remote and spaced apart from the optical sensor system 10. For example, for cryogenically cooled optical sensor systems 10 provided in a cryogenic thermal enclosure 30, as depicted in FIG. 1, integrating a light generator 26 within the thermal enclosure 30 would involve significant thermal and structural design complexities. Accordingly, the light generator 26 described herein may be remote and spaced apart from the optical sensor system 10 and the thermal enclosure 30, with the light guide 28 guiding the light generated by the light generator 26 into the thermal enclosure 30 to the calibration disc of the calibration assembly 12 within the optical sensor system 10. In this manner, structural and thermal design complexities involved in integrating the light source 16 into the optical sensor system 10 and thermal enclosure 30 may be reduced.

It is understood that the depicted optical sensor system 10 in the thermal enclosure 30 is provided as a non-limiting example, and that the principles of the calibration assembly 12 described herein are also applicable to optical sensor systems not provided in thermal enclosures, and to optical sensor systems with only part of the optical sensor system provided in a thermal enclosure. For example, the thermal enclosure 30 may only enclose the optical detector array 14 and associated hardware, instead of the entire optical sensor system 10.

Figure 3:
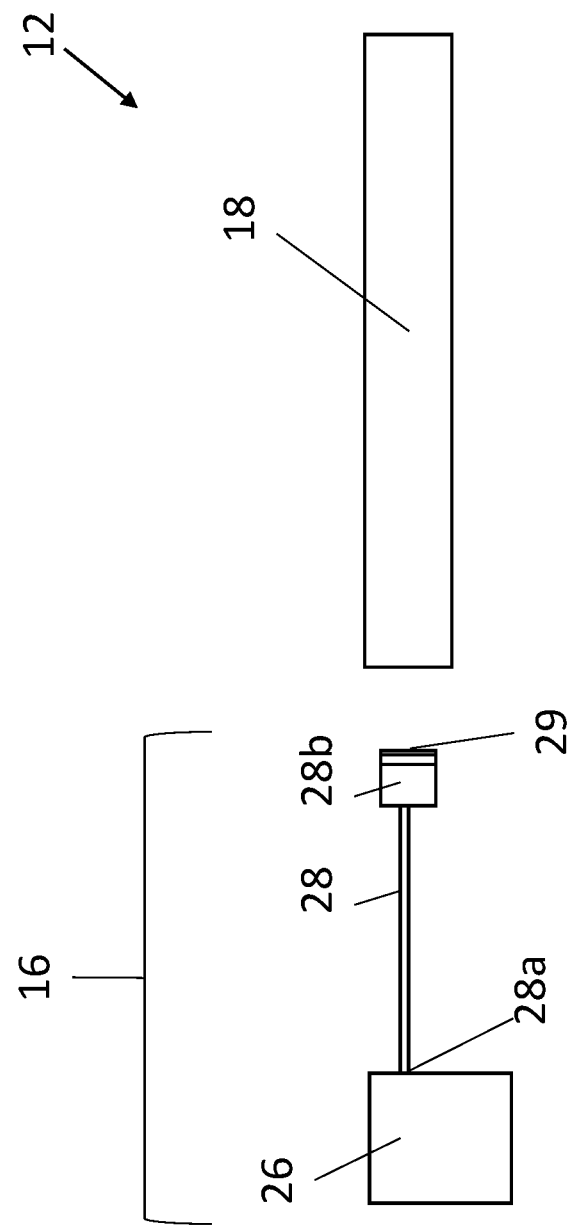
FIG. 3 is a general schematic of a calibration assembly.

In a general embodiment of the calibration assembly 12 depicted in FIG. 3, the light guide 28 is coupled to the light generator 26 at a proximal end 28a of the light guide 28 for guiding the light from the light generator 26 to a distal end 28b of the light guide 28, wherein the distal end 28b of the light guide 28 directs the light at the calibration disc 18. The distal end 28b of the light guide 28 may be spaced apart from the calibration disc 18 and is configured to direct light toward the calibration disc 18. For example, the distal end 28b of the light guide may include a collimator 29 for directing the light toward the calibration disc 18 in one or more discrete light beams. The distal end 28b of the light guide 28, or the collimator 29 of the light guide 28, may include an anti-reflective coating for maximizing the amount of light that leaves the light guide 28 instead of being reflected back to the light generator 26. The light generator 26 may be at least one of a light-emitting diode (LED) and a beam forming optic. The light guide 28 may be at least one of a waveguide and a fiber optic. It is understood, however, that the anti-reflective coating, the light generator and the light guide are provided as non-limiting examples, and that other types of reflection control, light generators and light guides may be applicable to aspects of this disclosure.

Figure 4:
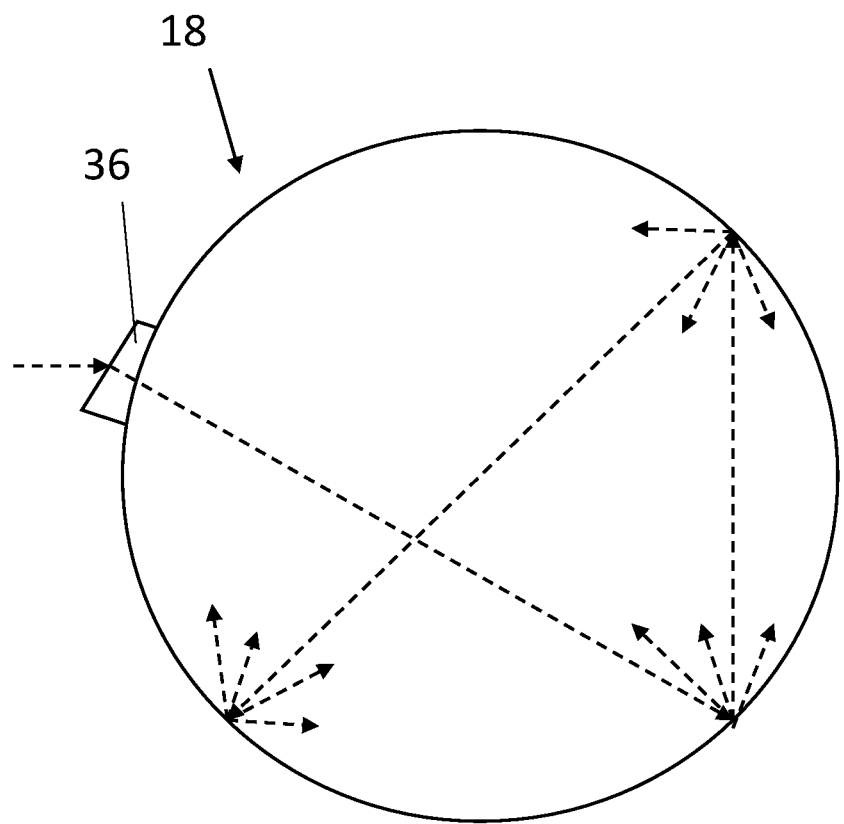
FIG. 4 is a top perspective view of a calibration disc.
Figure 5:
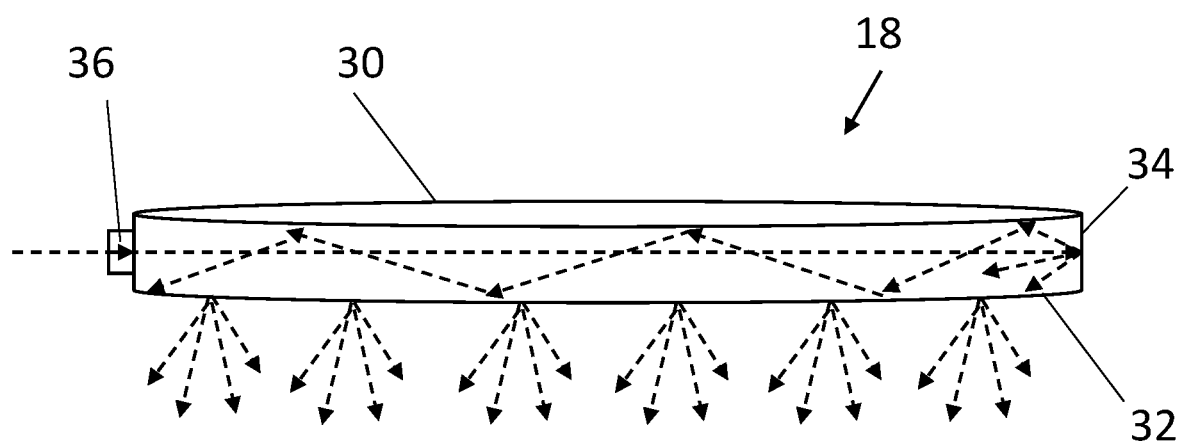
FIG. 5 is a side perspective view of the calibration disc of FIG. 4.

Turning now to FIGS. 4 and 5, the calibration disc 18 will be described in more detail. The calibration disc 18 includes a first major surface 30, a second major surface 32 and an edge surface 34. The edge surface 34 extends around a circumference of the calibration disc 18, coupling the circumferential edge of the first major surface 30 and the circumferential edge of the second major surface 32. The edge surface 34 of the calibration disc 18 includes an entrance aperture 36 positioned at the edge surface 34 and configured to receive light from the light generator 26 and/or the light guide 28 such that the light enters the calibration disc 18. For example, the entrance aperture 36 may be a small flat subsurface in the edge surface 34. In another embodiment, the entrance aperture 36 may extend through the edge surface 34, for example, when the calibration disc 18 is hollow. The entrance aperture 36 may have a cross-sectional shape that is round, oval, elliptical, square, rectangular, or any other suitable shape.

The entrance aperture 36 may be positioned at the edge surface 34 at an angle, relative to the edge surface. The angle of the entrance aperture 36 may be chosen such that the light entering the calibration disc 18 through the entrance aperture 36 forms a rotating star pattern within the calibration disc 18 as it reflects off of the edge surface 34 within the calibration disc 18. Additionally or alternatively, the light from the light generator 26 and/or the light guide 28 may travel to the entrance aperture 36 at an angle relative to the edge surface 34. The angle of the light may also be chosen such that the light entering the calibration disc 18 through the entrance aperture 36 forms a rotating star pattern within the calibration disc 18 as it reflects off of the edge surface 34 within the calibration disc 18. In any embodiment, the angle of the entrance aperture 36 and the angle of the light travelling to the entrance aperture 36 are chosen to minimize the amount of light photons that will exit the calibration disc 18 back through the entrance aperture 36 after reflecting off of the edge surface 34 within the calibration disc 18. Specifically, the angle of the entrance aperture 36 and the angle of the light travelling to the entrance aperture 36 may be chosen such that an angle of incidence (AOI) at the first reflection of the light off of the edge surface 34 is greater than 0 degrees and less than 36 degrees. With this range of AOI, the amount of photons that will exit the calibration disc 18 back through the entrance aperture 36 after the first reflection of the light off of the edge surface 34 will be minimized, and volumetric uniformity of photon energy within the calibration disc 18 will be facilitated with the generation of the rotating star pattern of light within the calibration disc 18. In another embodiment, the angle of the entrance aperture 36 and the angle of the light travelling to the entrance aperture 36 may be chosen such that the angle of incidence (AOI) at the first reflection of the light off of the edge surface 34 is greater than 36 degrees. The specific angles of the entrance aperture 36 and the light travelling to the entrance aperture 36, and the AOI at the first reflection of the light off of the edge surface 34, however, will depend on various other parameters, such as the index of refraction and waveband of the light.

The first major surface 30 and the second major surface 32 may have a diameter in the range of 90 millimeters to 110 millimeters, for example 100 millimeters, and the thickness of the calibration disc 18 (the distance between the first major surface 30 and the second major surface 32) may be in the range of 3 millimeters to 5 millimeters, for example 4 millimeters. The entrance aperture 36 may have a diameter in the range of 2 millimeters to 4 millimeters, for example 3 millimeters. It is understood, however, that the above-described dimensions of the calibration disc 18 are provided as non-limiting examples, and that other dimensions may be applicable depending on the application in which the calibration disc 18 is used.

The entrance aperture 36 is configured to receive light (as represented by the dashed line in FIGS. 4 and 5) from the light source 16, for example, into the calibration disc 18. The entrance aperture 36 may include an anti-reflective coating. The anti-reflective coating may be the same as that described above for the light guide 28. It is understood, however, that the anti-reflective coating is provided as a non-limiting example, and other types of reflection control may be applicable to aspects of this disclosure.

The first major surface 30 is fully reflective and at least partially diffuse (i.e., via Lambertian scattering). The first major surface 30 may be in the range of 5% to 20% diffuse, 7% to 15% diffuse, or 10% to 12% diffuse. The edge surface 34 is also fully reflective and at least partially diffuse. For example, the edge surface 34 may be in the range of 1% to 10% diffuse, 2% to 7% diffuse, or 3% to 5% diffuse. The second major surface 32, however, is only partially reflective and partially diffuse. For example, the second major surface 32 may be in the range of 30% to 60% reflective or 40% to 50% reflective, and 5% to 20% diffuse, 7% to 15% diffuse, or 10% to 12% diffuse. The first major surface 30, the edge surface 34 and the second major surface 32 may be configured to have the above described reflective and diffuse characteristics based on, for example, a respective surface roughness of each of the first major surface 30, the edge surface 34 and the second major surface 32. It is understood, however, that the first major surface 30, the edge surface 34 and the second major surface 32 may be configured to have the above described reflective and diffuse characteristics based on other surface characteristics as well.

In this manner, when light enters the entrance aperture 36 of the calibration disc 18, light will reflect off of each of the first major surface 30, the edge surface 34 and the second major surface 32 with specular and diffuse reflection (as represented by the dashed lines in FIGS. 4 and 5), making the light scattered within the calibration disc 18. However, as the second major surface 32 is only partially reflective and is partially diffuse, the second major surface 32 is configured to emit at least some of the scattered light out of the calibration disc 18 with uniform irradiance (as represented by the dashed lines in FIG. 5). Accordingly, the light that is emitted from the second major surface 32 may be emitted with uniform irradiance in angle and position such that the flux density of photons, collected by an optical detector array some distance away, is uniform across the area of the detector. As described above, because the calibration disc 18 is configured to be arranged within the optical sensor system 10 such that the second major surface 32 faces the optical detector array 14, the light that is emitted from the second major surface 32 may be directed toward the optical detector array 14 and may be used to perform NUC on the optical detector array 14.

Figure 6:
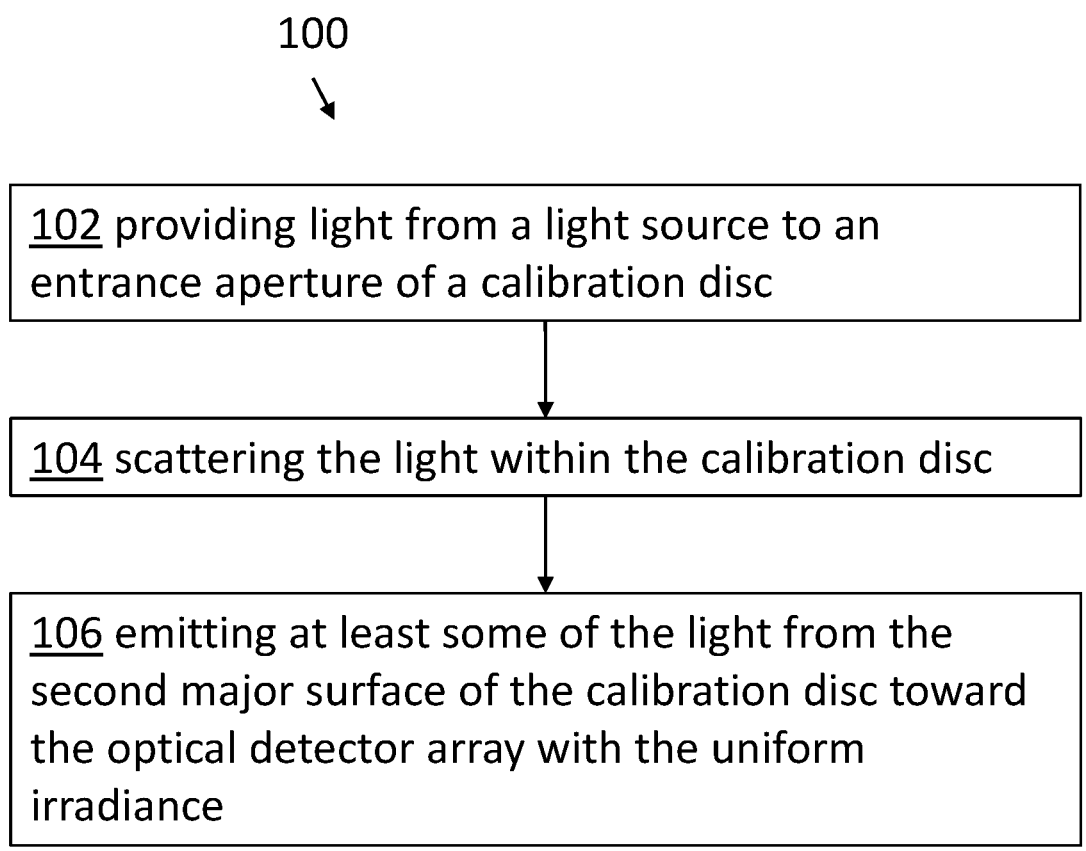
FIG. 6 is a flowchart of a method for providing uniform irradiance to an optical sensor system.

Turning now to FIG. 6, a method 100 for providing uniform irradiance to an optical detector array is depicted. The method 100 includes a step 102 of providing light from a light source to an entrance aperture of a calibration disc remote from the light source. For example, the light source and the calibration disc may be the same as the light source 16 and the calibration disc 18 described above with reference to FIGS. 1-4. Specifically, the light source may include a light generator and a light guide for guiding light generated by the light generator to the calibration disc, and the calibration disc may include a first major surface, a second major surface and an edge surface extending around a circumference of the calibration disc. The first major surface may be fully reflective and partially diffuse, the second major surface may be partially reflective and partially diffuse, and the edge surface may be fully reflective and partially diffuse and have an entrance aperture positioned at the edge surface. The method 100 may then include a step 104 of scattering the light within the calibration disc by each of the first major surface, the second major surface, and the edge surface, as described above with reference to the calibration disc 18 of FIGS. 4 and 5. The method 100 may therefore also include a step 106 of emitting at least some of the light from the second major surface toward the optical detector array with the uniform irradiance.

Although the above disclosure has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments. In addition, while a particular feature may have been described above with respect to only one or more of several illustrated embodiments, such feature may be combined with one or more other features of the other embodiments, as may be desired and advantageous for any given or particular application.

What is claimed is:

1. A calibration disc for providing uniform irradiance to an optical sensor system, the calibration disc including:
   a first major surface, the first major surface being fully reflective and partially diffuse;
   a second major surface opposite the first major surface, the second major surface being partially reflective and partially diffuse; and
   an edge surface extending around a circumference of the calibration disc, the edge surface being fully reflective and partially diffuse and having an entrance aperture positioned at the edge surface and configured to receive light into the calibration disc;
   wherein the first major surface, the second major surface and the edge surface are configured to scatter the light received by the entrance aperture within the calibration disc, and wherein the second major surface is configured to emit at least some of the light with uniform irradiance.

2. The calibration disc according to claim 1, wherein the entrance aperture is positioned at the edge surface at an angle relative to the edge surface.

3. The calibration disc according to claim 1, wherein the entrance aperture includes an anti-reflective coating.

4. The calibration disc according to claim 1, wherein the first major surface is in the range of 5% to 20% diffuse.

5. The calibration disc according to claim 1, wherein the second major surface is in the range of 5% to 20% diffuse.

6. The calibration disc according to claim 1, wherein the second major surface is in the range of 30% to 60% reflective.

7. The calibration disc according to claim 1, wherein the edge surface is in the range of 1% to 10% diffuse.

8. A calibration assembly for providing uniform irradiance to an optical sensor system, the calibration assembly comprising:
   a light source; and
   a calibration disc remote from the light source and including:
   a first major surface, the first major surface being fully reflective and partially diffuse;

a second major surface opposite the first major surface, the second major surface being partially reflective and partially diffuse; and an edge surface extending around a circumference of the calibration disc, the edge surface being fully reflective and partially diffuse and having an entrance aperture positioned at the edge surface and configured to receive light from the light source into the calibration disc;

wherein the first major surface, the second major surface and the edge surface scatter the light received from the light source by the entrance aperture within the calibration disc, and wherein the second major surface emits at least some of the light with uniform irradiance.

9. The calibration assembly according to claim 8, wherein the light source includes a light generator for generating the light and a light guide coupled to the light generator at a proximal end of the light guide for guiding the light from the light generator to a distal end of the light guide, wherein the distal end of the light guide directs the light at the entrance aperture of the calibration disc.

10. The calibration assembly according to claim 9, wherein the light generator is at least one of a light-emitting diode (LED) and a beam forming optic, and wherein the light guide is at least one of a waveguide and a fiber optic.

11. The calibration assembly according to claim 9, wherein the distal end of the light guide includes an anti-reflective coating.

12. The calibration assembly according to claim 8, wherein the entrance aperture of the calibration disc includes an anti-reflective coating.

13. The calibration assembly according to claim 8, wherein the entrance aperture is positioned at the edge surface of the calibration disc at an angle relative to the edge surface.

14. The calibration assembly according to claim 8, wherein the first major surface of the calibration disc is in the range of 5% to 20% diffuse.

15. The calibration assembly according to claim 8, wherein the second major surface of the calibration disc is in the range of 5% to 20% diffuse.

16. The calibration assembly according to claim 8, wherein the second major surface of the calibration disc is in the range of 30% to 60% reflective.

17. The calibration assembly according to claim 8, the edge surface of the calibration disc is in the range of 1% to 10% diffuse.

18. A method for providing uniform irradiance to an optical sensor system, the method comprising the steps of:

providing light from a light source to an entrance aperture of a calibration disc remote from the light source, the calibration disc including:

a first major surface, the first major surface being fully reflective and partially diffuse;

a second major surface opposite the first major surface, the second major surface being partially reflective and partially diffuse; and an edge surface extending around a circumference of the calibration disc, the edge surface being fully reflective and partially diffuse and having the entrance aperture positioned at the edge surface;

scattering the light within the calibration disc by each of the first major surface, the second major surface, and the edge surface; and emitting at least some of the light from the second major surface toward the optical sensor system with the uniform irradiance.

19. The method according to claim 18, wherein the first major surface of the calibration disc is in the range of 5% to 20% diffuse, and the edge surface of the calibration disc is in the range of 1% to 10% diffuse.

20. The method according to claim 18, wherein the second major surface of the calibration disc is in the range of 5% to 20% diffuse, and in the range of 30% to 60% reflective.

* * * * *